US012646944B2

(12) United States Patent
Fu

(10) Patent No.: US 12,646,944 B2
(45) Date of Patent: Jun. 2, 2026

(54) METHODS FOR SAFETY INSPECTION OF LNG DISTRIBUTED ENERGY SMART TERMINALS, INTERNET OF THINGS (IOT) SYSTEMS, AND STORAGE MEDIA

(71) Applicant: CHENGDU JIUGUAN SMART ENERGY TECHNOLOGY CO., LTD., Sichuan (CN)

(72) Inventor: Lin Fu, Chendu (CN)

(73) Assignee: CHENGDU JIUGUAN SMART ENERGY TECHNOLOGY CO., LTD., Chengdu (CN)

( * ) Notice: Subject to any disclaimer, the term of this patent is extended or adjusted under 35 U.S.C. 154(b) by 534 days.

(21) Appl. No.: 18/313,324

(22) Filed: May 6, 2023

(65) Prior Publication Data

US 2023/0361568 A1    Nov. 9, 2023

(30) Foreign Application Priority Data

May 7, 2022    (CN) .......................... 202210491636.5

(51) Int. Cl.
*H02J 3/17*        (2026.01)
*G06Q 10/06*    (2023.01)
*H02J 101/10*    (2026.01)

(52) U.S. Cl.
CPC ............... *H02J 3/17* (2026.01); *G06Q 10/06* (2013.01); *H02J 2101/10* (2026.01)

(58) Field of Classification Search
CPC ......... G06Q 10/06; H02J 3/17; H02J 2101/10
See application file for complete search history.

(56) References Cited

U.S. PATENT DOCUMENTS

2004/0128613 A1* 7/2004 Sinisi ..................... G06Q 10/00
715/203
2005/0289060 A1* 12/2005 Abumehdi ............ H04L 9/0825
705/50

(Continued)

OTHER PUBLICATIONS

A. Varma, Prabhakar S and K. Jayavel, "Gas Leakage Detection and Smart Alerting and prediction using IoT," 2017 2nd International Conference on Computing and Communications Technologies (ICCCT), Chennai, India, 2017, pp. 327-333.*

(Continued)

*Primary Examiner* — Timothy Padot
(74) *Attorney, Agent, or Firm* — METIS IP LLC

(57) ABSTRACT

The present disclosure provides a method for a safety inspection of an LNG distributed energy smart terminal, an Internet of Things (IoT) system, and a storage medium. The method includes collecting operation and maintenance data of the LNG smart terminal and personnel data of a safety inspector and uploading the collected data to a management platform; monitoring an operation and maintenance situation of the LNG smart terminal in real-time, and generating an inspection order reminder and an inspection instruction according to a preset safety inspection mechanism; matching an inspection requirement of the LNG smart terminal with inspection data of the each safety inspector and sending the inspection instruction and the inspection order reminder to an optimal safety inspector for the safety inspection; and after completing the safety inspection, sending inspection completion information to the management platform, and confirming completion of the safety inspection after receiving the inspection completion information.

10 Claims, 6 Drawing Sheets

(56)                    References Cited

U.S. PATENT DOCUMENTS

| | | | |
|---|---|---|---|
| 2009/0237245 A1* | 9/2009 | Brinton | G08G 1/20 |
| | | | 340/540 |
| 2013/0117066 A1* | 5/2013 | Park | G06Q 10/06 |
| | | | 705/7.28 |
| 2016/0010445 A1* | 1/2016 | Harrison | E21B 47/00 |
| | | | 702/6 |
| 2019/0121334 A1* | 4/2019 | Song | G06N 20/00 |
| 2021/0400031 A1* | 12/2021 | Ilic | H04L 63/10 |
| 2022/0244720 A1* | 8/2022 | Minegishi | G05B 23/0262 |

OTHER PUBLICATIONS

C. K. Metallidou, K. E. Psannis and E. A. Egyptiadou, "Energy Efficiency in Smart Buildings: IoT Approaches," in IEEE Access, vol. 8, pp. 63679-63699, 2020.*

Y. A. Ramegowda and F. K. P. Mishra, "Improving the Real-Time Operations of an Industrial Facility using a Machine Learning based Self Adaptive System," 2021 International Conference on Intelligent Technologies (CONIT), Hubli, India, 2021, pp. 1-7.*

M. r. Akhondi, A. Talevski, S. Carlsen and S. Petersen, "Applications of Wireless Sensor Networks in the Oil, Gas and Resources Industries," 2010 24th IEEE International Conference on Advanced Information Networking and Applications, Perth, WA, Australia, 2010, pp. 941-948.*

T. R. Wanasinghe, T. Trinh, T. Nguyen, R. G. Gosine, L. A. James and p. J. Warrian, "Human Centric Digital Transformation and Operator 4.0 for the Oil and Gas Industry," in IEEE Access, vol. 9, pp. 113270-113291, 2021.*

* cited by examiner

Figure 2:
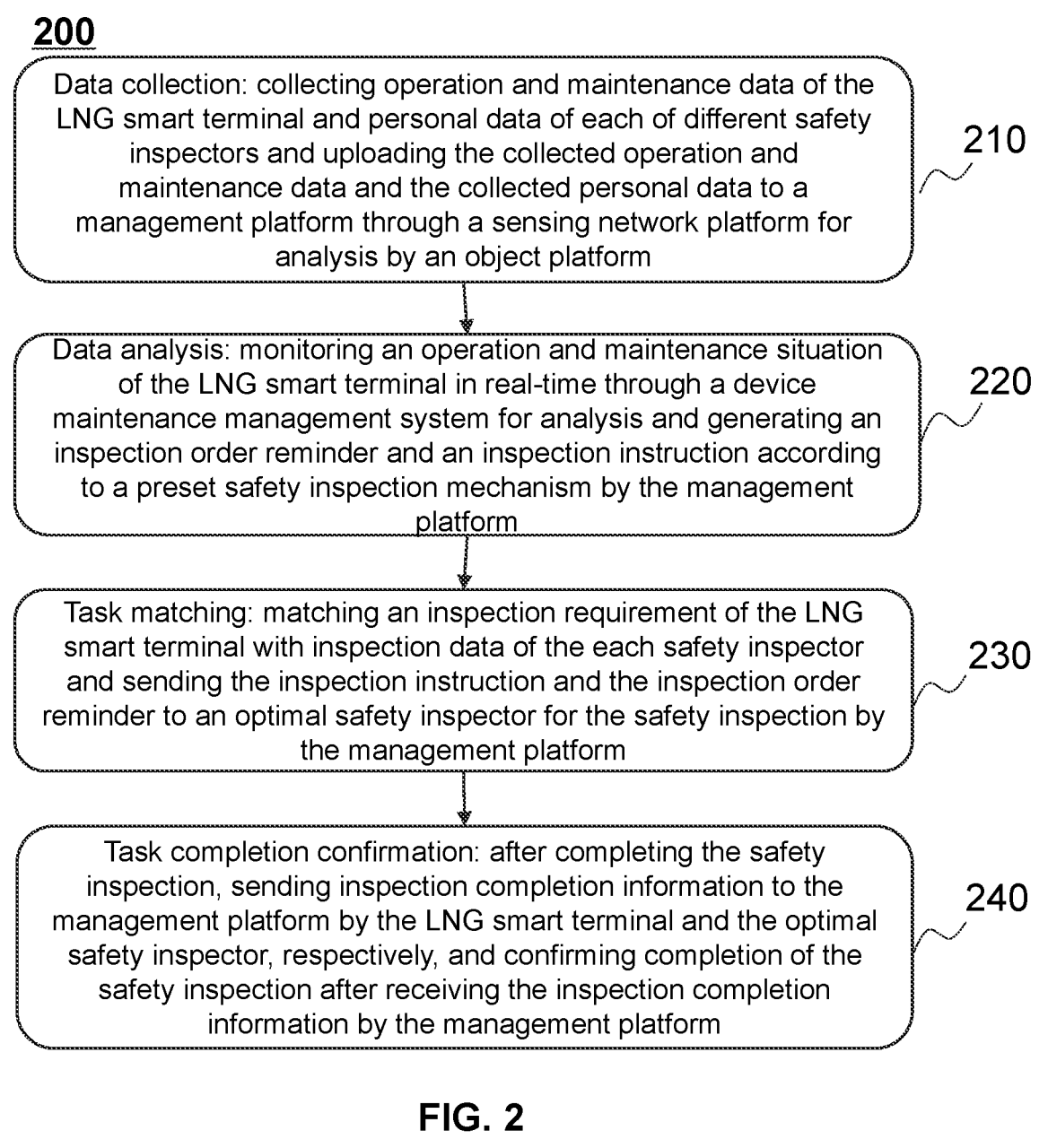

200

Data collection: collecting operation and maintenance data of the LNG smart terminal and personal data of each of different safety inspectors and uploading the collected operation and maintenance data and the collected personal data to a management platform through a sensing network platform for analysis by an object platform          210

Data analysis: monitoring an operation and maintenance situation of the LNG smart terminal in real-time through a device maintenance management system for analysis and generating an inspection order reminder and an inspection instruction according to a preset safety inspection mechanism by the management platform          220

Task matching: matching an inspection requirement of the LNG smart terminal with inspection data of the each safety inspector and sending the inspection instruction and the inspection order reminder to an optimal safety inspector for the safety inspection by the management platform          230

Task completion confirmation: after completing the safety inspection, sending inspection completion information to the management platform by the LNG smart terminal and the optimal safety inspector, respectively, and confirming completion of the safety inspection after receiving the inspection completion information by the management platform          240

Obtaining a terminal location distribution of LNG smart terminals that currently need inspections — 410

Determining a preset inspection distance condition based on the terminal location distribution — 420

METHODS FOR SAFETY INSPECTION OF LNG DISTRIBUTED ENERGY SMART TERMINALS, INTERNET OF THINGS (IOT) SYSTEMS, AND STORAGE MEDIA

CROSS-REFERENCE TO RELATED APPLICATIONS

This application claims the priority of the Chinese Patent Application No. 202210491636.5, filed on May 7, 2022, the entire contents of which are incorporated herein by reference.

TECHNICAL FIELD

The present disclosure relates to the technical field of composite Internet of Things (IoT), and in particular, to a method for a safety inspection of an LNG distributed energy smart terminal based on a multi-object composite IoT, an IoT system, and a storage medium.

BACKGROUND

Natural gas is widely used in life for its advantages of environmental protection, safety, and low cost, however, it is still inaccessible for living and working in economically underdeveloped areas such as remote suburban counties, mountainous areas, and rural areas where pipelines are inadequate.

However, remote suburban counties, mountainous areas, and rural areas are potential markets for urban gas. As an integral part of a country's overall energy system, energy supply and consumption in these areas inevitably affect the energy supply and requirement in China. At present, the focus of urban construction is gradually shifting from urban areas to distant suburban counties, mountainous areas, and rural areas strategically, requiring the establishment of an efficient, safe, and economical energy supply system.

Liquefied natural gas (LNG) has attracted much attention as a clean energy source. The combustion of natural gas produces only 50% and 20% of the carbon dioxide and nitrogen oxides compared to coal and is only $\frac{1}{4}$ of LPG and $\frac{1}{800}$ of coal in terms of pollution. Due to the high investment cost of pipeline laying, LNG gasification stations are more economical than pipeline gas. In small and medium-sized towns, the LNG gasification stations can be used as gas sources for residents. In addition, they can also be used for businesses, public institutions, residential heating, etc.

At present, the operation and management of supply and transmission of LNG are in the exploration and development stage. The operation and maintenance of LNG smart terminals cannot be perceived and detected, and a location and working status of inspectors cannot be obtained, thus making it impossible to ensure that the inspectors inspect key device on time and as required. There is a lack of a safety inspection mechanism to match the inspection requirement of the smart terminals and the location and working status of each inspector to achieve reasonable and efficient scheduling of the inspectors, and at the same time, the protection of the safety inspection data needs to be improved in terms of security.

SUMMARY

The purpose of the present disclosure is to overcome the shortcomings of the prior art and provide a method for a safety inspection of an LNG distributed energy smart terminal, an Internet of Things (IoT) system, and a storage medium, which collects an operation and maintenance situation of the LNG smart terminal and personal current location information and a working status of a safety inspector respectively through an object platform and uploads collected perception information to a management platform through a sensing network platform. Through a device maintenance management system, the operation and maintenance situation of the LNG smart terminal device is monitored in real-time, and an inspection order reminder and an inspection instruction are formed according to a preset safety inspection mechanism. The management platform realizes reasonable and efficient scheduling of safety inspectors by matching the inspection requirement of the LNG smart terminal with a location and working status of the safety inspector to ensure that the safety inspector can maintain the LNG smart terminal on time according to contents of a inspection order.

The purpose of the present disclosure is achieved by a following technical solution: the method for the safety inspection of the LNG distributed energy smart terminal, including following steps: data collection: data collection: collecting operation and maintenance data of the LNG smart terminal and personal data of each of different safety inspectors and uploading the collected operation and maintenance data and the collected personal data to a management platform through a sensing network platform for analysis by an object platform; data analysis: monitoring an operation and maintenance situation of the LNG smart terminal in real-time through a device maintenance management system for analysis and generating an inspection order reminder and an inspection instruction according to a preset safety inspection mechanism by the management platform; task matching: matching an inspection requirement of the LNG smart terminal with inspection data of the each safety inspector and sending the inspection instruction and the inspection order reminder to an optimal safety inspector for the safety inspection by the management platform; and task completion confirmation: after completing the safety inspection, sending inspection completion information to the management platform by the LNG smart terminal and the optimal safety inspector, respectively, and confirming completion of the safety inspection after receiving the inspection completion information by the management platform.

In some embodiments, the data collection process specifically includes: encrypting plaintext of the operation and maintenance data of the LNG smart terminal using an Advanced Encryption Standard (AES) algorithm and uploading encrypted operation and maintenance data to an LNG smart terminal sensing network platform by the LNG smart terminal, and uploading the encrypted operation and maintenance data to the management platform by the LNG smart terminal sensing network platform; and forming different safety inspection object platforms for the different safety inspectors, and transmitting the personal data of the each safety inspector to the management platform through a safety inspector sensing network platform, the personal data including personal current location information and a working status.

In some embodiments, the encrypting plaintext of the operation and maintenance data of the LNG smart terminal using an Advanced Encryption Standard (AES) algorithm by the LNG smart terminal includes: generating in advance a key for the LNG smart terminal and distributing the key to the LNG smart terminal by the management platform; and encrypting the operation and maintenance data using the key and uploading an encrypted operation and maintenance data file to the LNG smart terminal sensing network platform by the LNG smart terminal.

In some embodiments, the operation and maintenance data includes an LNG smart terminal number, a location, a put-into-use time, an operation time, and a maintenance time.

In some embodiments, the data analysis includes: after receiving encrypted operation and maintenance data uploaded by an LNG smart terminal sensing network platform, decrypting the encrypted operation and maintenance data using a key corresponding to the LNG smart terminal, monitoring the operation and maintenance situation of the LNG smart terminal using the device maintenance management system after obtaining plaintext of the operation and maintenance data, and judging whether the LNG smart terminal needs to be maintained by judging the operation and maintenance situation of the LNG smart terminal according to a preset maintenance condition by the management platform; and if the LNG smart terminal needs to be maintained, forming the inspection order reminder and the inspection instruction according to the preset safety inspection mechanism combined with the operation and maintenance data corresponding to the LNG smart terminal by the management platform.

In some embodiments, the task-matching specifically includes: decrypting operation and maintenance data uploaded by an LNG smart terminal to be maintained and obtaining location information of the LNG smart terminal to be maintained through the management platform; analyzing the personal data of the each safety inspector uploaded by a safety inspector sensing network platform, obtaining personal current location information and a working status of the each safety inspector, and judging whether the each safety inspector is in the working status by the management platform; and performing an optimal matching calculation on the working status and the personal current location information of the each safety inspector with the location information of the LNG smart terminal to be maintained, determining the optimal safety inspector according to a calculation result, and sending the inspection order reminder and the inspection instruction to the optimal safety inspector for the safety inspection by the management platform.

In some embodiments, the optimal matching calculation includes: first calculating a distance between a personal current location of the each safety inspector and a location of the LNG smart terminal and selecting safety inspectors with a distance less than a preset distance; and giving priority matching to a safety inspector who is not in the working status, estimating an inspection completion time of the safety inspector arriving at the location of the LNG smart terminal, and if the inspection completion time exceeds a preset time threshold, estimating completion times of all safety inspectors in the working status, and selecting a safety inspector with a shortest completion time as the optimal safety inspector for the safety inspection.

In some embodiments, the task completion confirmation process includes: after receiving the inspection order reminder and the inspection instruction, the optimal safety inspector going to a designated location according to a location of an LNG smart terminal to be maintained in the inspection order reminder; and after arriving at the designated location, the optimal safety inspector photographing the LNG smart terminal to be maintained via a handheld terminal to obtain an inspection image and sending the inspection image to the management platform; the management platform receiving and displaying the inspection image and a receiving time of the inspection image, extracting information of the LNG smart terminal to be maintained from the inspection image, and matching the information with information of the LNG smart terminal to be maintained in the inspection order reminder, if the matching is successful, judging whether the receiving time of the inspection image is time-out according to a preset inspection arrival time, and if not, sending a task matching success reminder to the handheld terminal of the optimal safety inspector; and after completing inspection and maintenance, photographing a maintained LNG smart terminal and uploading an inspection completion image to the management platform, obtaining an inspection and maintenance operation result through the maintained LNG smart terminal, and sending inspection completion information to the management platform by the optimal safety inspector, confirming completion of the task after receiving the inspection completion image and the inspection completion information by the management platform.

In some embodiments, determining the preset inspection distance condition includes: obtaining a terminal location distribution of LNG smart terminals that currently need inspections; and determining the preset inspection distance condition based on the terminal location distribution.

In some embodiments, the determining the preset inspection distance condition based on the terminal location distribution includes: determining an inspection geometric center of locations of the LNG smart terminals that currently need inspections based on the terminal location distribution; determining an inspection radius based on the inspection geometric center; and determining the preset inspection distance condition based on the inspection radius.

In some embodiments, the estimating an inspection completion time of the safety inspector arriving at the location of the LNG smart terminal includes: obtaining personnel features of the safety inspector, terminal features of the LNG smart terminal, and location features of a start point and an end point; and predicting the inspection completion time based on the personnel features, the terminal features, and the location features.

In some embodiments, the predicting the inspection completion time based on the personnel features, the terminal features, and the location features includes: predicting the inspection completion time by processing the personnel features, the terminal features, and the location features through an inspection completion time prediction model, wherein the inspection completion time prediction model is a machine learning model.

In some embodiments, the inspection completion time prediction model includes a route planning layer, a time prediction layer, and a time integration layer.

In some embodiments, the terminal features include a failure probability distribution.

An Internet of Things (IoT) system for a safety inspection of an LNG distributed energy smart terminal, implemented using the aforementioned method for the safety inspection of the LNG distributed energy smart terminal. The Internet of Things (IoT) system includes an object platform, a sensing network platform, a management platform, a service platform, and a user platform; the object platform is used to collect the operation and maintenance data of the LNG smart terminal and the personal data of the each safety inspector; the sensing network platform is used to implement a communication connection between the management platform and the object platform for perception and control; the management platform is used to analyze the collected operation and maintenance data and the collected personal data, generate a safety inspection task and send the safety inspection task to the optimal safety inspector for processing, and confirm completion of the safety inspection task; the service platform is used to obtain perception information needed by a user from the management platform for parsing and storage, receive control information issued by the user for processing, and send processed control information to the management platform; and the user platform is used for various types of users to obtain perception information of the LNG smart terminal from the service platform and send the control information to the service platform.

In some embodiments, the object platform includes the LNG smart terminal and a safety inspector personal terminal; the LNG smart terminal is used to store LNG and perceive the operation and maintenance data of the LNG smart terminal; and the safety inspector personal terminal is used to perceive and obtain the personal data of the each safety inspector and receive the safety inspection task.

In some embodiments, the sensing network platform includes an LNG smart terminal sensing network platform and a safety inspector sensing network platform; the safety inspector sensing network platform is used to transmit the personal data of the each safety inspector to the management platform and send the safety inspection task to the safety inspector personal terminal; and the LNG smart terminal sensing network platform is used to upload the operation and maintenance data of the LNG smart terminal and send relevant control information to the LNG smart terminal.

In some embodiments, the management platform is used to: decrypt operation and maintenance data uploaded by an LNG smart terminal to be maintained and obtaining location information of the LNG smart terminal to be maintained; analyze the personal data of the each safety inspector uploaded by a safety inspector sensing network platform, obtain personal current location information and a working status of the each safety inspector, and judge whether the each safety inspector is in the working status by the management platform; and perform an optimal matching calculation on the working status and the personal current location information of the each safety inspector with the location information of the LNG smart terminal to be maintained, determine the optimal safety inspector according to a calculation result, and send the inspection order reminder and the inspection instruction to the optimal safety inspector for the safety inspection by the management platform.

In some embodiments, the management platform is used to: first calculate a distance between a personal current location of the each safety inspector and a location of the LNG smart terminal and select safety inspectors with a distance less than a preset distance; and give priority matching to a safety inspector who is not in the working status, estimate an inspection completion time of the safety inspector arriving at the location of the LNG smart terminal, and if the time exceeds a preset time threshold, estimate completion times of all safety inspectors in the working status, and select a safety inspector with a shortest completion time as the optimal safety inspector for the safety inspection.

In some embodiments, the management platform is used to: obtain a terminal location distribution of LNG smart terminals that currently need inspections; and determine the preset inspection distance condition based on the terminal location distribution.

One or more embodiments of the present disclosure provide a non-transitory computer-readable storage medium. The storage medium stores computer instructions, and when the computer instructions are executed by a processor, the method for the safety inspection of the LNG distributed energy smart terminal aforementioned is implemented.

Beneficial effects of the present disclosure includes: the operation and maintenance situation of the LNG smart terminal and the personal current location information and working status of the safety inspector are collected separately through the object platform, and the collected perception information is uploaded to a management platform through the sensing network platform, and the operation and maintenance situation of the LNG smart terminal is monitored in real-time through the device maintenance management system, and the inspection order reminder and the inspection instruction are generated according to the preset safety inspection mechanism; the management platform realizes reasonable and efficient scheduling of safety inspectors by matching the inspection requirement of the LNG smart terminal with the location and working status of the each safety inspector to ensure that the safety inspector can maintain the LNG smart terminal on time according to the contents of the inspection orders. In addition, for each LNG smart terminal in the present disclosure, a data encryption algorithm is also used to encrypt operation and maintenance data of the LNG smart terminal to ensure the security of data transmission.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2 is an exemplary flowchart of a method for a safety inspection of an LNG smart terminal according to some embodiments of the present disclosure;

DETAILED DESCRIPTION

Figure 1:
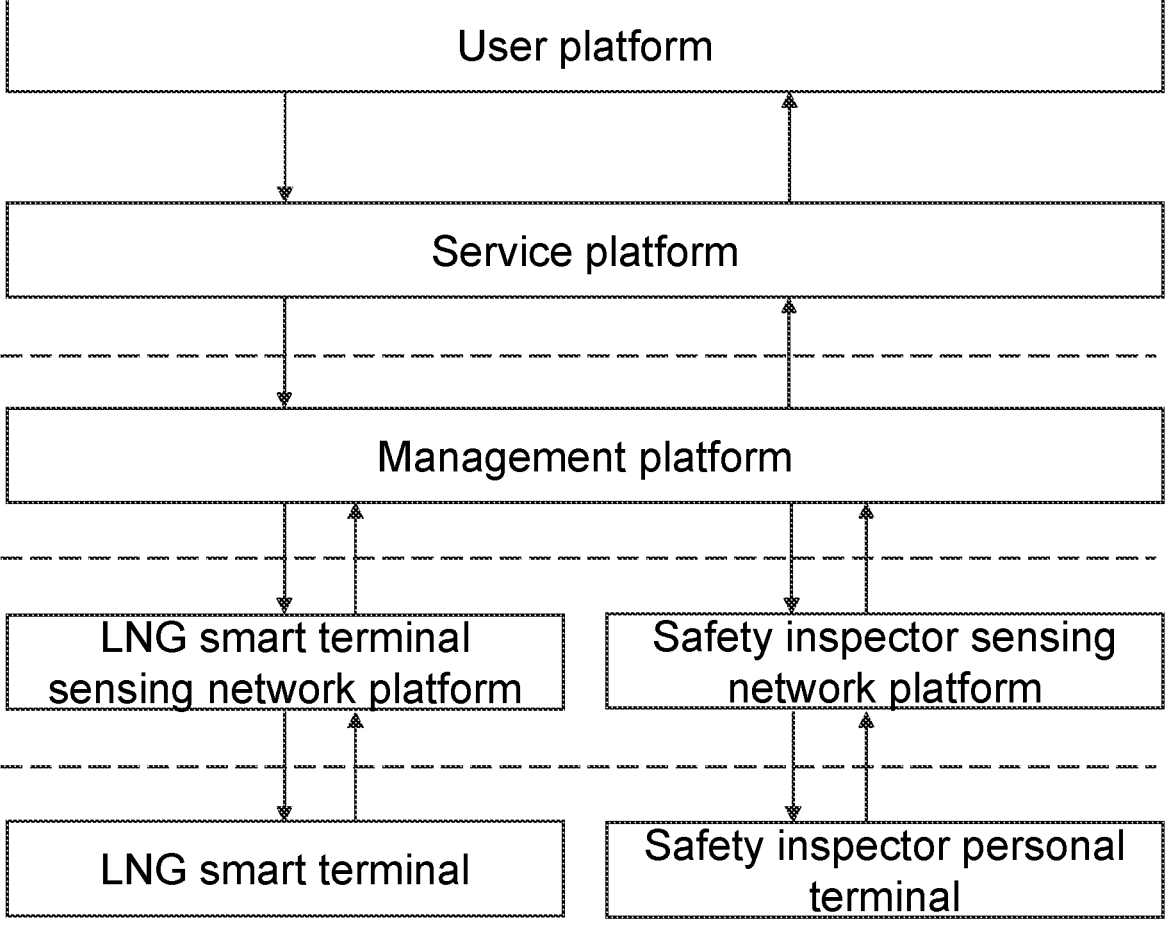
FIG. 1 is an exemplary structure diagram of an Internet of Things (IoT) system for a safety inspection of an LNG distributed energy smart terminal according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is an exemplary structure diagram of an Internet of Things (IoT) system for a safety inspection of an LNG distributed energy smart terminal according to some embodiments of the present disclosure. As shown in FIG. 1, the IoT system includes an object platform, a sensing network platform, a management platform, a service platform, and a user platform.

The object platform is used to collect operation and maintenance data of the LNG smart terminal and personal data of a safety inspector.

The sensing network platform is used to implement a communication connection between the management platform and the object platform for perception and control.

The management platform is used to analyze the collected operation and maintenance data and personal data, generate a safety inspection task, and send the safety inspection task to the safety inspector for processing.

The service platform is used to obtain perception information needed by a user from the management platform for analysis and storage, receive control information sent by the user for processing, and send control information to the management platform.

The user platform is used for various users to obtain the perception information of the LNG smart terminal from the service platform, and to send the control information to the service platform.

In this embodiment, the object platform includes an LNG smart terminal and a safety inspector personal terminal, and the LNG smart terminal is used to store LNG and perceive the operation and maintenance data of the LNG smart terminal; and the safety inspector personal terminal is used to perceive and obtain the personal data of the safety inspector and receive a safety inspection task.

In this embodiment, the sensing network platform specifically includes an LNG smart terminal sensing network platform and a safety inspector sensing network platform; the safety inspector sensing network platform is used to transmit the personal data of the safety inspector to the management platform and send the safety inspection task to the safety inspector personal terminal; and the LNG smart terminal sensing network platform is used to upload the operation and maintenance data of the LNG smart terminal and send relevant control information to the LNG smart terminal.

FIG. 2 is an exemplary flowchart of a method for a safety inspection of an LNG smart terminal according to some embodiments of the present disclosure. In some embodiments, a process 200 may be executed by an Internet of Things (IoT) system for safety inspection of an LNG distributed energy smart terminal. As shown in FIG. 2, the process 200 may include the following steps.

Step 210, data collection: collecting operation and maintenance data of the LNG smart terminal and personal data of each of different safety inspectors and uploading the collected operation and maintenance data and the collected personal data to a management platform through a sensing network platform for analysis by an object platform.

Step 220, data analysis: monitoring an operation and maintenance situation of the LNG smart terminal in real-time through a device maintenance management system for analysis and generating an inspection order reminder and an inspection instruction according to a preset safety inspection mechanism by the management platform.

Step 230, task matching: matching an inspection requirement of the LNG smart terminal with inspection data of the each safety inspector and sending the inspection instruction and the inspection order reminder to an optimal safety inspector for the safety inspection by the management platform.

Step 240, task completion confirmation: after completing the safety inspection, sending inspection completion information to the management platform by the LNG smart terminal and the optimal safety inspector, respectively, and confirming completion of the safety inspection after receiving the inspection completion information by the management platform.

In this embodiment, the data collection specifically includes: encrypting plaintext of the operation and maintenance data of the LNG smart terminal using an Advanced Encryption Standard (AES) algorithm and uploading encrypted operation and maintenance data to an LNG smart terminal sensing network platform by the LNG smart terminal, and uploading the encrypted operation and maintenance data to the management platform by the LNG smart terminal sensing network platform; and forming different safety inspection object platforms for the different safety inspectors, and transmitting the personal data of the each safety inspector to the management platform through a safety inspector sensing network platform, the personal data including personal current location information and a working status.

The operation and maintenance data includes a number, a location, a put-into-use time, an operation time, and a maintenance time of the LNG smart terminal.

The AES algorithm is an advanced encryption standard algorithm.

An encryption principle includes that AddRoundKey is actually a form of Vernam cipher, which is not difficult to crack. Three other stages together provide confusion, diffusion, and non-linear functions. These three stages do not involve keys and, by themselves, do not provide security of the algorithm. However, the algorithm goes through XOR encryption of a block (AddRoundKey), then obfuscated diffusion of the block (three other stages), then XOR encryption again. The above process is performed alternately, which is very effective and safe.

Reversible principle includes: each stage is reversible. For byte substitution, row shifting, and column obfuscation, their corresponding inverse functions are used in the decryption algorithm. The inverse of AddRoundKey means to use a same round key and a block cipher to XOR, and the principle thereof is:

$$A \oplus B \oplus B = A$$

Like most block ciphers, the AES decryption algorithm uses an extended key in reverse order. However, due to a specific structure of AES, the decryption algorithm is different from the encryption algorithm.

Figure 3:
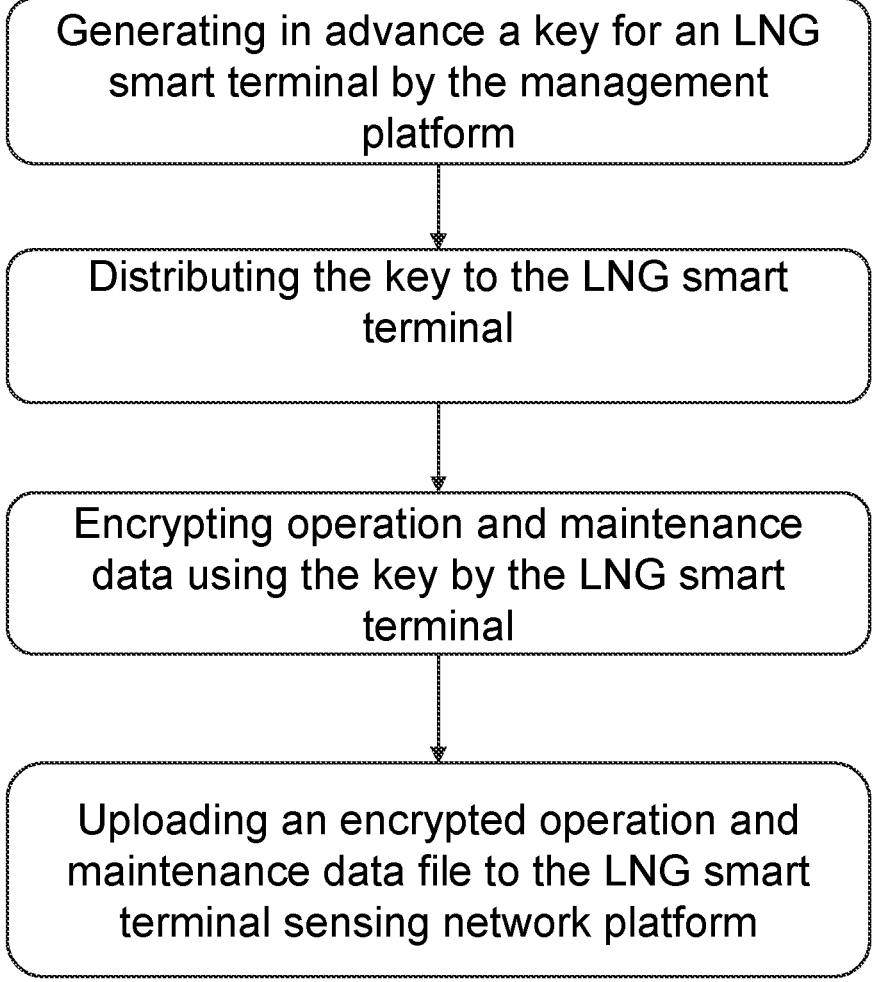
FIG. 3 is a flowchart illustrating an exemplary process for encrypting and decrypting operation and maintenance data using an AES algorithm according to some embodiments of the present disclosure.

Further, as shown in FIG. 3, encrypting plaintext of the operation and maintenance data of the LNG smart terminal using the AES algorithm includes: generating in advance a key for the LNG smart terminal and distributing the key to the LNG smart terminal by the management platform; and encrypting the operation and maintenance data using the key and uploading an encrypted operation and maintenance data file to the LNG smart terminal sensing network platform by the LNG smart terminal.

In this embodiment, the data analysis includes: after receiving encrypted operation and maintenance data uploaded by an LNG smart terminal sensing network platform, decrypting the encrypted operation and maintenance data using a key corresponding to the LNG smart terminal, monitoring the operation and maintenance situation of the LNG smart terminal using the device maintenance management system after obtaining plaintext of the operation and maintenance data, and judging whether the LNG smart terminal needs to be maintained by judging the operation and maintenance situation of the LNG smart terminal according to a preset maintenance condition by the management platform; and if the LNG smart terminal needs to be maintained, forming the inspection order reminder and the inspection instruction according to the preset safety inspection mechanism combined with the operation and maintenance data corresponding to the LNG smart terminal by the management platform.

An inspection order generally includes a number, a type, an image of appearance, location information, and information on key points of device maintenance of an LNG smart terminal to be maintained, etc.

In this embodiment, the task-matching specifically includes: decrypting operation and maintenance data uploaded by an LNG smart terminal to be maintained and obtaining location information of the LNG smart terminal to be maintained through the management platform; analyzing the personal data of the each safety inspector uploaded by a safety inspector sensing network platform, obtaining personal current location information and a working status of the each safety inspector, and judging whether the each safety inspector is in the working status by the management platform; and performing an optimal matching calculation on the working status and the personal current location information of the each safety inspector with the location information of the LNG smart terminal to be maintained, determining the optimal safety inspector according to a calculation result, and sending the inspection order reminder and the inspection instruction to the optimal safety inspector for the safety inspection by the management platform.

The optimal matching calculation includes: first calculating a distance between a personal current location of the each safety inspector and a location of the LNG smart terminal and selecting safety inspectors with a distance less than a preset distance; and giving priority matching to a safety inspector who is not in the working status, estimating an inspection completion time of the safety inspector arriving at the location of the LNG smart terminal, and if the inspection completion time exceeds a preset time threshold, estimating completion times of all safety inspectors in the working status, and selecting a safety inspector with a shortest completion time as the optimal safety inspector for the safety inspection.

In this embodiment, the task completion confirmation includes: after receiving the inspection order reminder and the inspection instruction, the optimal safety inspector going to a designated location according to a location of an LNG smart terminal to be maintained in the inspection order reminder; and after arriving at the designated location, the optimal safety inspector photographing the LNG smart terminal to be maintained via a handheld terminal to obtain an inspection image and sending the inspection image to the management platform; the management platform receiving and displaying the inspection image and a receiving time of the inspection image, extracting information of the LNG smart terminal to be maintained from the inspection image, and matching the information with information of the LNG smart terminal to be maintained in the inspection order reminder, if the matching is successful, judging whether the receiving time of the inspection image is time-out according to a preset inspection arrival time, and if not, sending a task matching success reminder to the handheld terminal of the optimal safety inspector; and after completing inspection and maintenance, photographing a maintained LNG smart terminal and uploading an inspection completion image to the management platform, obtaining an inspection and maintenance operation result through the maintained LNG smart terminal, and sending inspection completion information to the management platform by the optimal safety inspector, confirming completion of the task after receiving the inspection completion image and the inspection completion information by the management platform.

In this embodiment, an asymmetric encryption algorithm is used to replace the AES algorithm to encrypt the operation and maintenance data of the LNG smart terminal, so as to improve data security and encryption efficiency.

If a symmetric encryption algorithm is used and a same key is used for encryption and decryption, the other party must know this key to decrypt data in addition to keeping the key to a user himself, and there is a possibility of cipher leakage. This embodiment uses an asymmetric algorithm, and the process is as follows:

First, a receiver generates a pair of keys, i.e., a private key and a public key; then the receiver sends the public key to a sender; the sender encrypts data with the received public key, and then sends encrypted data to the receiver; and after receiving the data, the receiver decrypts the data with the own private key of the receiver.

Since in the asymmetric algorithm, the data encrypted by the public key may be decrypted with the corresponding private key, which is known only by the receiver, the security of data transmission is thus ensured.

In this embodiment, the asymmetric encryption algorithm is used to encrypt and decrypt operation and maintenance data as follows: generating a pair of public key and private key in advance through the management platform and distributing the public key to a corresponding LNG smart terminal; encrypting the operation and maintenance data of the LNG smart terminal with the public key by the LNG smart terminal, and uploading an operation and maintenance data file formed after encryption to the management platform through the LNG smart terminal sensing network platform; after receiving the encrypted operation and maintenance data uploaded by the LNG smart terminal sensing network platform, decrypting the encrypted operation and maintenance data using the private key corresponding to the LNG smart terminal, monitoring the operation and maintenance situation of the LNG smart terminal using the device maintenance management system after obtaining plaintext of the encrypted operation and maintenance data, and judging whether the LNG smart terminal needs to be maintained by judging the operation and maintenance situation of the LNG smart terminal according to a preset maintenance condition by the management platform.

In practice, the public key mechanism also has drawbacks, which are very inefficient and may be an order of magnitude or two slower than commonly used private key algorithms such as Data Encryption Standard (DES) and Advanced Encryption Standard (AES). So the public key mechanism is not suitable for encrypting large amounts of raw information. In order to take into account both security and efficiency, a public key algorithm and a private key algorithm are usually combined for encryption. The specific process is as follows.

1. First, a sender encrypts original information using a symmetric algorithm.
2. A receiver generates a pair of keys including a public key and a private key through the public key mechanism.
3. The receiver sends the public key to the sender.
4. The sender encrypts a key of the symmetric algorithm with the public key and sends the encrypted key of the symmetric algorithm to the receiver.
5. The receiver uses the private key to decrypt to obtain the key of the symmetric algorithm.
6. The sender sends the encrypted original information to the receiver.
7. The receiver uses the key of the symmetric algorithm to decrypt the encrypted original information.

In this embodiment, encryption and decryption of the operation and maintenance data is performed using a public key algorithm and a private key algorithm as follows: encrypting the operation and maintenance data by the LNG smart terminal using the symmetric algorithm; generating a pair of keys including a public key and a private key by the management platform using the public key mechanism and sending the public key to the LNG smart terminal; encrypting the key of the symmetric algorithm by the LNG smart terminal using the public key and sending the encrypted key of the symmetric algorithm to the management platform; decrypting and obtaining the key of the symmetric algorithm by the management platform using the private key; sending the encrypted operation and maintenance data to the management platform by the LNG smart terminal; and decrypting the operation and maintenance data by the management platform using the key of the symmetric algorithm.

Figure 4:
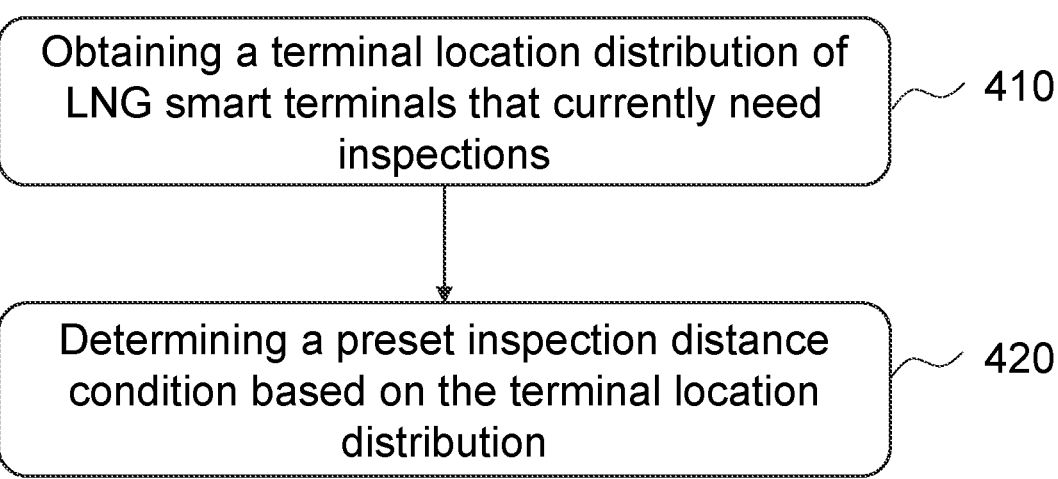
FIG. 4 is a flowchart illustrating an exemplary process for determining a preset inspection distance condition according to some embodiments of the present disclosure.

FIG. 4 is a flowchart illustrating an exemplary process for determining a preset inspection distance condition according to some embodiments of the present disclosure. In some embodiments, a process 400 may be performed by a management platform. As shown in FIG. 4, the process 400 may include step 410 and step 420.

Step 410: obtaining a terminal location distribution of LNG smart terminals that currently need inspections.

The terminal location distribution refers to parameters related to the location distribution of the LNG smart terminals. For example, the terminal location distribution may be $[(x_1, y_1), (x_2, y_2), (x_3, y_3) \ldots , (x_n, y_n)]$. $(x_1, y_1)$, $(x_2, y_2)$, $(x_3, y_3) \ldots , (x_n, y_n)$ respectively represent coordinates of different locations of the LNG smart terminals that currently need inspections In some embodiments, the management platform may obtain the terminal location distribution of LNG the smart terminals that currently need inspections in various ways. For example, the management platform may obtain the terminal location distribution by accessing a storage device of an LNG smart terminal that currently needs an inspection.

Step 420, determining the preset inspection distance condition based on the terminal location distribution.

The preset inspection distance condition refers to a condition related to the inspection distance of a safety inspector. For example, the preset inspection distance condition may be that the inspection distance of the safety inspector is less than a distance threshold.

In some embodiments, the management platform may determine the preset inspection distance condition based on the terminal location distribution in various ways. For example, the management platform may determine the preset inspection distance condition through a preset data comparison table based on the terminal location distribution. Different preset inspection distance conditions corresponding to different terminal location distributions are recorded in the preset data comparison table. The preset data comparison table may be preset based on prior knowledge or historical data.

In some embodiments, for a situation in which there are a plurality of LNG smart terminals that currently need inspections, the management platform may determine an inspection geometric center of locations of the LNG smart terminals that currently need inspections based on the terminal location distribution; determine an inspection radius based on the inspection geometric center; and determine the preset inspection distance condition based on the inspection radius.

The inspection geometric center refers to a centroid of the locations of the LNG smart terminals that currently need inspections.

In some embodiments, the management platform may determine the inspection geometric center of the locations of the LNG smart terminals that currently need inspections based on the terminal location distribution in various ways. For example, the management platform may regard n LNG smart terminals that currently need inspections as mass points, whose masses are $m_1$, $m_2$, $m_3 \ldots$ and $m_n$, respectively, and the distribution of terminal locations is $[(x_1, y_1), (x_2, y_2), (x_3, y_3) \ldots (x_n, y_n)]$, then the inspection geometric center $(x_a, y_a)$ may be calculated by equations:

$$x_a = \frac{\sum_{i=1}^{n} m_i x_i}{\sum_{i=1}^{n} m_i}$$

$$y_a = \frac{\sum_{i=1}^{n} m_i y_i}{\sum_{i=1}^{n} m_i}$$

wherein xi is a horizontal coordinate of a location of an i-th LNG smart terminal ($1 \leq i \leq n$); $y_i$ is a vertical coordinate of the location of the i-th LNG smart terminal; $m_i$ is the mass of the i-th LNG smart terminal when it is regarded as a mass point. In some embodiments, $m_1$, $m_2$, $m_3$, $\ldots$, and $m_n$ may be preset values, default values, etc. For example, $m_1$, $m_2$, $m_3$, $\ldots$, and $m_n$ may be 1.

In some embodiments, when the n LNG smart terminals that currently need inspections are regarded as mass points, their masses may be related to failure probability distributions of the LNG smart terminals. For example, the greater the probability of failure of the LNG smart terminal, the greater the mass of the LNG smart terminal when it is regarded as a mass point. As another example, the greater the probability of serious failure of the LNG smart terminal, the greater the mass of the LNG smart terminal when it is regarded as a mass point.

The failure probability distribution refers to a probability distribution of various failures in an LNG smart terminal. For example, the failure probability distribution may include but is not limited to, a probability distribution of gas leakage, a failure to pre-cool, and an excessive pressure in a storage tank of an LNG smart terminal, etc. In some embodiments, the failure probability distribution may be expressed in the form of vectors, for example, the failure probability distribution may be expressed as [(gas leakage, $a_1$), (failure to pre-cool, $a_2$), (excessive pressure in storage tank pressure, $a_3$)]. $a_1$, $a_2$, and $a_3$ are respectively the probability of gas leakage, failure to pre-cool, and excessive pressure in the storage tank.

In some embodiments, the management platform may calculate an average of occurrence probabilities of various failures in the failure probability distribution, and use the average as the failure probability of the LNG smart terminal. The failure probability of the LNG smart terminal may also be determined in other ways. For example, the management platform may use a weighted summation of the occurrence probabilities of the various failures in the failure probability distribution as the failure probability of the LNG smart terminal. The weights of the occurrence probabilities of the various failures may be default values, preset values, etc. In some embodiments, the type of a serious failure (for example, gas leakage) may be preset, and its corresponding occurrence probability may be used as a probability of a serious failure of the LNG smart terminal.

In some embodiments, the management platform may obtain the failure probability distribution in various ways. For example, the management platform may access a storage device of an LNG smart terminal to obtain a number of times of various failures of the LNG smart terminal in a historical time period, and obtain the failure probability distribution of the LNG smart terminal.

In some embodiments of the present disclosure, by relating the mass of the LNG smart terminal that currently needs inspections when it is regarded as a mass point to the failure probability distribution of that LNG smart terminal, the inspection geometry center is made closer to LNG smart terminals that are prone to failure or prone to serious failure, so that the safety inspection of such LNG smart terminals can be conducted more quickly.

The inspection radius refers to a distance between a safety inspector and the inspection geometric center.

In some embodiments, the management platform may determine the inspection radius based on the inspection geometric center in various ways. For example, the management platform may separately calculate a distance between a location of an LNG smart terminal that currently needs inspections and the inspection geometric center, and record a value with a largest distance as $R_1$; and the management platform then determines an adjustment value $R_2$; then the inspection radius may be $R_1+R_2$.

The adjustment value refers to a value used to adjust the inspection distance. In some embodiments, the management platform may determine the adjustment value in various ways. For example, the adjustment value may be determined based on historical experience (for example, in consideration of historical inspection efficiency, when $R_2$ takes a certain value, the final macro inspection efficiency is higher).

In some embodiments, the management platform may determine the preset inspection distance condition based on the inspection radius in various ways. For example, the management platform may determine the preset inspection distance condition to be that a distance between the safety inspector and the inspection geometric center is smaller than the inspection radius.

In some embodiments of the present disclosure, the inspection geometric center is determined through the terminal location distribution, the inspection radius is determined based on the inspection geometric center, and finally the preset inspection distance condition is obtained, so that the safety inspector satisfying the preset inspection distance condition is closer to the inspection geometric center, thereby inspecting each LNG smart terminal more equally, or formulating a shorter inspection route to improve inspection efficiency.

In some embodiments of the present disclosure, the preset inspection distance condition is determined through the terminal location distribution of the LNG smart terminals that currently need inspections, and the locations of the LNG smart terminals that currently need inspections are considered, which is conducive to improving the inspection efficiency of the safety inspector.

Figure 5:
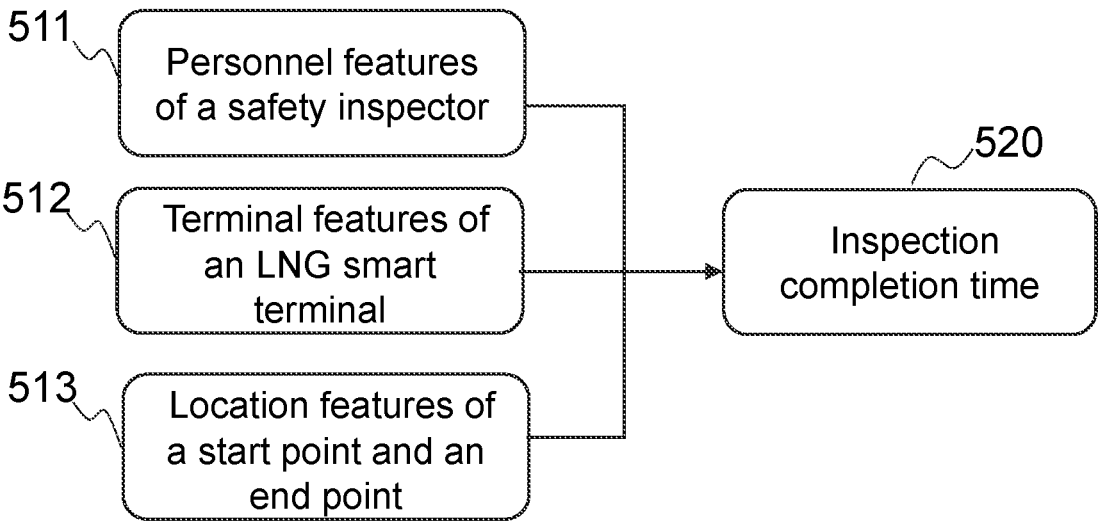
FIG. 5 is a schematic diagram illustrating an exemplary process for determining an inspection completion time according to some embodiments of the present disclosure.

FIG. 5 is a schematic diagram illustrating an exemplary process for determining an inspection completion time according to some embodiments of the present disclosure.

In some embodiments, the management platform may obtain personnel features of a safety inspector 511, terminal features of an LNG smart terminal 512, and location features of a start point and an end point 513; and predict an inspection completion time 520 based on the personnel features, terminal features, and location features.

The personnel features refer to features related to the safety inspector. For example, the personnel features may include but not limited to a total count of historical inspections of the safety inspector, a total count of inspections in a latest time period (for example, the last week), a historical failure recognition rate, a fault recognition rate in the latest time period (for example, the last week), etc.

In some embodiments, the management platform may obtain the personnel features in various ways. For example, the management platform may obtain the personnel features by accessing a storage device of the safety inspection personnel terminal.

The terminal features refer to features related to the LNG smart terminal. For example, the terminal features may include but are not limited to a terminal type, a service life, and a continuous use time of the LNG smart terminal.

In some embodiments, the terminal features also include a failure probability distribution. More information about the failure probability distribution may be found in FIG. 4 and its related description.

In some embodiments of the present disclosure, due to the different probabilities of various failures in the LNG smart terminal, inspection content, problems encountered during the inspection process, sudden failures, etc., may also be different, resulting in different inspection completion times. When predicting the inspection completion time, the introduction of the failure probability distribution of the LNG smart terminal can help make the final inspection completion time more accurate.

The start point refers to an LNG smart terminal that is inspected first. The end point refers to an LNG smart terminal that is inspected last. The location features of the start point and the end point refer to features related to the locations of the start point and the end point. For example, the location features of the start point and the end point may include but are not limited to the location coordinates of the start point and the end point.

In some embodiments, the management platform may obtain the terminal features and the location features of the start point and the end point in various ways. For example, the management platform may obtain the terminal features and the location features of the start point and the end point by accessing the storage device of the LNG smart terminal.

The inspection completion time refers to a time required for the safety inspector to complete the inspection of the LNG smart terminal.

In some embodiments, the management platform may predict the inspection completion time based on the personnel features, terminal features, and location features in various ways. For example, the management platform may create an object vector based on the personnel features, terminal features, and location features; based on the object vector, determine a correlated vector through a vector database; and determine a reference inspection completion time corresponding to the correlated vector as the inspection completion time corresponding to the object vector.

The object vector refers to a vector created based on the personnel features, terminal features, and location features. There may be various ways to create the object vector. For example, a processor may input the personnel features, terminal features, and location features into an embedding layer for processing to obtain the object vector. In some embodiments, the embedding layer may be obtained through joint training with an inspection completion time prediction model.

The vector database includes a plurality of reference vectors, and each of the plurality of reference vectors has a corresponding reference inspection completion time.

The reference vector refers to a vector created based on historical personnel features, historical terminal features, and historical location features during a safety inspection in a historical time period. The reference inspection completion time corresponding to the reference vector may be a historical inspection completion time for the safety inspection conducted during the historical time period. The reference vector may be created by referring to the manner for creating the object vector above.

In some embodiments, the management platform may separately calculate a vector distance between the object vector and the reference vector, and determine the inspection completion time of the object vector. For example, a reference vector whose vector distance from the object vector satisfying a preset condition may be used as the correlated vector, and the reference inspection completion time corresponding to the correlated vector may be used as the inspection completion time corresponding to the object vector. The preset condition may be set according to different situations. For example, the preset condition may be that the vector distance is the smallest or the vector distance is smaller than a distance threshold, or the like. The vector distance may include but not limited to, a cosine distance, or the like.

In some embodiments, the management platform may process the personnel features, terminal features, and location features through the inspection completion time prediction model to predict the inspection completion time, and the inspection completion time prediction model is a machine learning model. For more information on predicting the inspection completion time by the inspection completion time prediction model, please refer to FIG. 6 and related descriptions.

In some embodiments of the present disclosure, the inspection completion time is predicted based on personnel features, terminal features, and location features, the inspection proficiency of the safety inspectors, the current situations of operation and maintenance of smart terminals that need an inspection, etc., are taken into account, so that the finally predicted inspection completion time can be more accurate.

Figure 6:
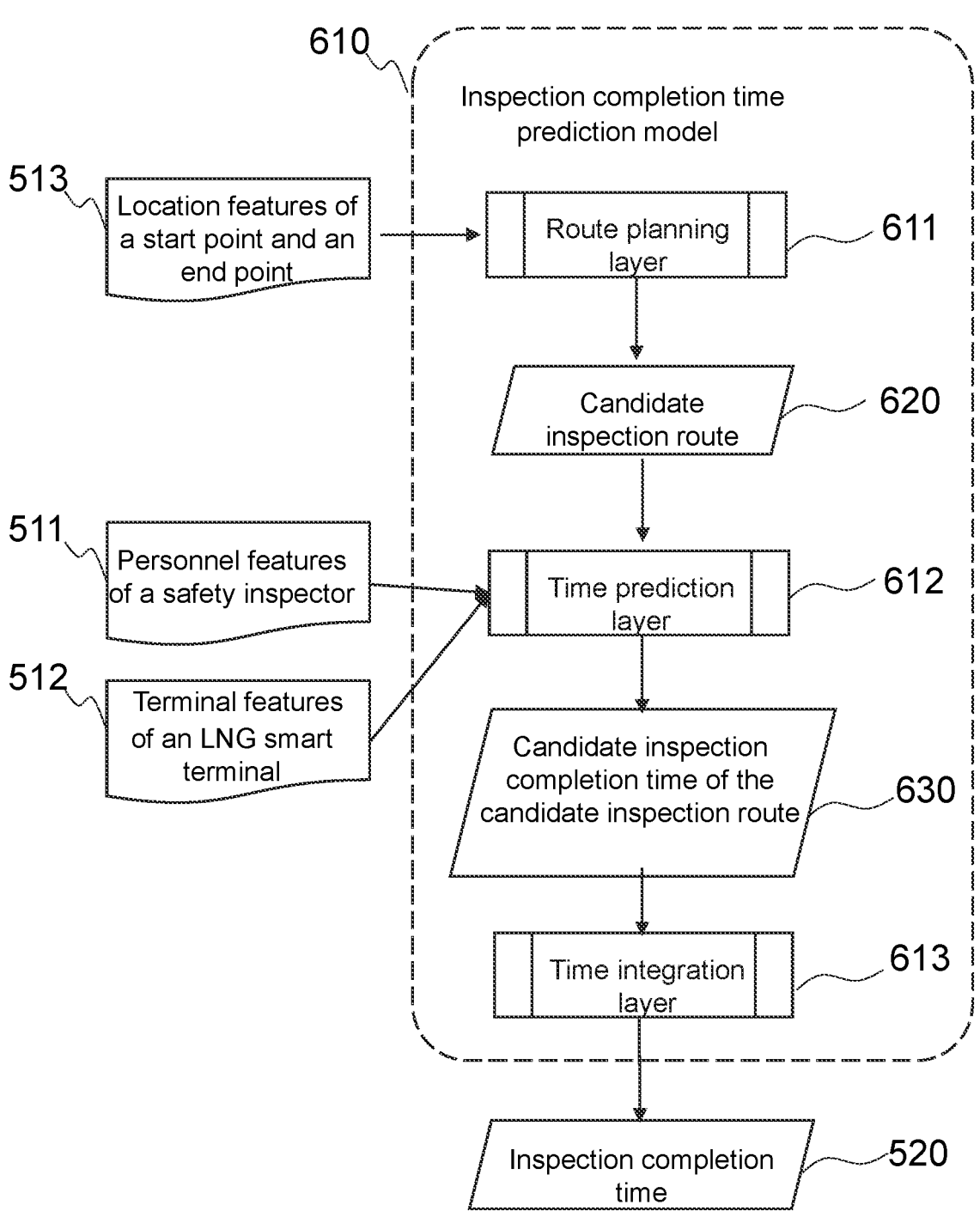
FIG. 6 is an exemplary schematic diagram of an inspection completion time prediction model according to some embodiments of the present disclosure.

FIG. 6 is an exemplary schematic diagram of an inspection completion time prediction model according to some embodiments of the present disclosure.

An inspection completion time prediction model 610 may be a machine learning model for determining an inspection completion time. For example, the inspection completion time prediction model may be a neural network (NN) model or other models. As another example, the inspection completion time prediction model may be a deep neural networks (DNN) model, etc.

In some embodiments, an input of the inspection completion time prediction model 610 may include the personnel features of the safety inspector 511, the terminal features of the LNG smart terminal 512, and the location features of the start point and the end point 513; and an output may include the inspection completion time 520. For more information about the personnel features of the safety inspector 511, the terminal features of the LNG smart terminal 512, and the location features of the start point and the end point 513, please refer to FIG. 5 and its related descriptions.

In some embodiments, the inspection completion time prediction model 610 may include a route planning layer 611, a time prediction layer 612, and a time integration layer 613.

The route planning layer 611 may be a machine learning model for determining candidate inspection routes. In some embodiments, an input of the route planning layer 611 may include the location features of the start point and the end point 513; and the output may include one or more candidate inspection routes 620.

The candidate inspection routes 620 refer to optional inspection routes.

The time prediction layer 612 may be a machine learning model for predicting a candidate completion time of a candidate inspection route. In some embodiments, an input of the time prediction layer 612 may include the personnel features of the safety inspector 511, the terminal features of the LNG smart terminal 512, and the candidate inspection route 620; and the output may include a candidate inspection completion time of the candidate inspection route 630. In some embodiments, each candidate inspection route is individually input to the time prediction layer each time to obtain a candidate completion time corresponding to the candidate inspection route.

The time integration layer 613 may be an algorithm model for determining the inspection completion time. In some embodiments, the time integration layer 613 may process the input candidate inspection completion times of a plurality of candidate inspection routes 630 in various ways, and output the inspection completion time 520. For example, the time integration layer may calculate an average of the candidate completion times of the plurality of candidate inspection routes, and output the average as the inspection completion time. The time integration layer may process the candidate completion times of the plurality of candidate inspection routes in other ways, for example, taking a maximum value of the candidate completion times of the plurality of candidate inspection routes as the inspection completion time and outputting it.

In some embodiments of the present disclosure, the output candidate inspection route of the route planning layer may be used as the input of the time prediction layer, and the candidate completion times of the plurality of candidate inspection routes may be calculated through the integration of the time integration layer to obtain the predicted inspection completion time, which can avoid the prediction of the inspection completion time only for a single inspection route, and improve the prediction accuracy of the inspection completion time.

In some embodiments, the route planning layer may be obtained by training a plurality of first training samples with a first label. For example, the plurality of first training samples with the first label may be input into an initial route planning layer, a loss function is constructed through the first label and results of the initial route planning layer, and parameters of the initial route planning layer are iteratively updated based on the loss function. When the loss function of the initial route planning layer satisfies a preset iteration condition, module training is completed, and a trained route planning layer is obtained. The preset iteration condition may be that the loss function converges, or the count of iterations reaches a threshold, or the like.

In some embodiments, the first training sample may include sample location features of a sample start point and a sample end point. The first label may include a sample candidate inspection route corresponding to the first training sample. In some embodiments, the first training sample may be obtained through historical data (for example, historical location features of a historical start point and a historical end point). In some embodiments, the management platform may obtain the first label corresponding to the first training sample in various ways. For example, the management platform may determine the corresponding sample candidate inspection route through a heuristic pathfinding algorithm based on the sample location features of the sample start point and the sample end point. The management platform may also obtain the sample candidate inspection route in other ways. For example, the management platform may determine the corresponding sample candidate inspection route through manners such as dynamic programming based on the sample location features of the sample start point and sample end point.

In some embodiments, when the management platform generates a plurality of sample candidate inspection routes based on the sample location features of the sample start point and the sample end point through the heuristic pathfinding algorithm, the dynamic programming, etc., the management platform may rank the plurality of sample candidate routes according to lengths of the inspection routes from short to long, and select first N sample candidate inspection routes as the first label of the first training sample. The size of N may be an experience value, a default value, a preset value, or the like.

In some embodiments, the ranking of the sample candidate inspection routes may be also related to the failure probability distribution of the LNG smart terminal. For example, the greater the failure probability of the LNG smart terminal, the higher the ranking of the sample candidate inspection routes for the priority inspection of the LNG smart terminal. For more information about the failure probability distribution of the terminal, refer to FIG. 4 and related descriptions.

In some embodiments of the present disclosure, when generating the first label based on the first training sample, the inspection order of different LNG smart terminals in the sample candidate inspection route is also considered, and the sample candidate inspection route of the LNG smart terminal with a higher failure probability is prioritized as the first label, and the trained route planning layer, the output candidate inspection route may also prioritize the inspection of the LNG smart terminal with a higher failure probability, which improves the inspection efficiency of safety inspectors.

In some embodiments, the time prediction layer may be obtained by training a plurality of second training samples with a second label. The training process of the time prediction layer is similar to that of the route planning layer. For the training process of the time prediction layer, please refer to the training process of the route planning layer above.

In some embodiments, the second training samples may include sample personnel features, sample terminal features, and sample inspection routes. The second label may include sample candidate completion times of the sample inspection routes corresponding to the second training samples. In some embodiments, the second training samples and the second label may be obtained through historical data (e.g., historical personnel features, historical terminal features, historical inspection routes, historical inspection completion times when a safety inspector performed a safety inspection during a historical time period)

In some embodiments of the present disclosure, the inspection completion time prediction model may be used to process the personnel features of the safety inspector, the terminal features of the LNG smart terminal, the location features of the start point and the end point, and determine the inspection completion time. By considering the influence of multiple factors at the same time, the inspection completion time can be determined efficiently and accurately, avoiding the error of manual determination.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

20

What is claimed is:

1. A non-transitory computer-readable storage medium storing instructions that, when executed by one or more processors, cause the one or more processors to perform operations comprising:

data collection: collecting operation and maintenance data of an LNG smart terminal and personal data of each of different safety inspectors;

data analysis: monitoring an operation and maintenance situation of the LNG smart terminal in real-time for analysis and generating an inspection order reminder and an inspection instruction;

task matching: matching an inspection requirement of the LNG smart terminal with inspection data of each safety inspector and sending the inspection instruction and the inspection order reminder to an optimal safety inspector for safety inspection; wherein the task matching includes:

decrypting the operation and maintenance data uploaded by an LNG smart terminal to be maintained and obtaining location information of the LNG smart terminal to be maintained; analyzing the personal data of each safety inspector, obtaining personal current location information and a working status of each safety inspector, and judging whether each safety inspector is in the working status; and performing an optimal matching calculation on the working status and the personal current location information of each safety inspector with the location information of the LNG smart terminal to be maintained, determining the optimal safety inspector according to a calculation result, and sending the inspection order reminder and the inspection instruction to the optimal safety inspector for the safety inspection; wherein the optimal matching calculation includes:

first calculating a distance between a personal current location of each safety inspector and a location of the LNG smart terminal and selecting safety inspectors with a distance less than a preset distance; and giving priority matching to a safety inspector who is not in the working status, estimating an inspection completion time of the safety inspector arriving at the location of the LNG smart terminal, and if the inspection completion time exceeds a preset time threshold, estimating completion times of all safety inspectors in the working status, and selecting a safety inspector with a shortest completion time as the optimal safety inspector for the safety inspection; wherein the estimating an inspection completion time of the safety inspector arriving at the location of the LNG smart terminal includes:

obtaining personnel features of the safety inspector, terminal features of the LNG smart terminal, and location features of a start point and an end point; predicting the inspection completion time by processing the personnel features, the terminal features, and the location features through an inspection completion time prediction model, wherein the inspection completion time prediction model is a machine learning model; wherein the inspection completion time prediction model includes a route planning layer, a time prediction layer, and a time integration layer; wherein the route planning layer is a machine learning model for determining candidate inspection routes, an input of the route planning layer include the location features of the start point and the end point, and an output of the route planning layer include one or more candidate inspection routes; the time prediction layer is a machine learning model for predicting a candidate completion time of a candidate inspection route, an input of the time prediction layer include the personnel features of the safety inspector, the terminal features of the LNG smart terminal, and the candidate inspection route, and an output of the time prediction layer include a candidate inspection completion time of the candidate inspection route; the time integration layer is an algorithm model for determining the inspection completion time, the time integration layer processes candidate inspection completion times of a plurality of candidate inspection routes and outputs the inspection completion time; and the route planning layer is obtained by training a plurality of first training samples with first labels, the plurality of first training samples with the first labels are input into an initial route planning layer, a loss function is constructed through the first labels and results of the initial route planning layer, parameters of the initial route planning layer are iteratively updated based on the loss function, and when the loss function of the initial route planning layer satisfies a first preset iteration condition, training is completed, and the route planning layer is obtained, wherein the first preset iteration condition is that the loss function converges, or a count of iterations reaches a threshold; wherein a construction method of the first label of the first training sample includes: generating a plurality of sample candidate inspection routes based on sample location features of a sample start point and a sample end point through a heuristic pathfinding algorithm or a dynamic programming method; ranking the plurality of sample candidate inspection routes according to lengths of the inspection routes from short to long and a failure probability distribution of the LNG smart terminal; and selecting first N sample candidate inspection routes as the first label of the first training sample; and the failure probability distribution comprises a probability distribution of various failures in the LNG smart terminal, including a probability distribution of gas leakage, a failure to pre-cool, and an excessive pressure in a storage tank of the LNG smart terminal; and task completion confirmation: after completing the safety inspection, obtaining inspection completion information sent by the LNG smart terminal and the optimal safety inspector, respectively, and confirming completion of the safety inspection based on the inspection completion information.

2. The non-transitory computer-readable storage medium according to claim 1, wherein the data collection executed by the one or more processors includes:

encrypting plaintext of the operation and maintenance data of the LNG smart terminal using an Advanced Encryption Standard (AES) algorithm by the LNG smart terminal; and obtaining the personal data of each of different safety inspectors, the personal data including personal current location information and a working status.

3. The non-transitory computer-readable storage medium according to claim 2, wherein the encrypting plaintext of the operation and maintenance data of the LNG smart terminal using an Advanced Encryption Standard (AES) algorithm by the LNG smart terminal via the one or more processors includes:

generating in advance a key for the LNG smart terminal and distributing the key to the LNG smart terminal; and encrypting the operation and maintenance data using the key and obtaining an encrypted operation and maintenance data file uploaded to the LNG smart terminal by the LNG smart terminal.

4. The non-transitory computer-readable storage medium according to claim 1, wherein the data analysis executed by the one or more processors includes:

after receiving encrypted operation and maintenance data, decrypting the encrypted operation and maintenance data using a key corresponding to the LNG smart terminal, monitoring the operation and maintenance situation of the LNG smart terminal after obtaining plaintext of the operation and maintenance data, and judging whether the LNG smart terminal needs to be maintained by judging the operation and maintenance situation of the LNG smart terminal according to a preset maintenance condition; and if the LNG smart terminal needs to be maintained, forming the inspection order reminder and the inspection instruction according to the operation and maintenance data corresponding to the LNG smart terminal.

5. The non-transitory computer-readable storage medium according to claim 1, wherein the task completion confirmation executed by the one or more processors includes:

after the optimal safety inspector receives the inspection order reminder and the inspection instruction, instructing the optimal safety inspector to go to a designated location according to a location of the LNG smart terminal to be maintained in the inspection order reminder; and after the optimal safety inspector arrives at the designated location, instructing the optimal safety inspector to photograph the LNG smart terminal to be maintained via a handheld terminal to obtain an inspection image, based on the inspection image and a receiving time of the inspection image, extracting information of the LNG smart terminal to be maintained from the inspection image, and matching the information with information of the LNG smart terminal to be maintained in the inspection order reminder, if the matching is successful, judging whether the receiving time of the inspection image is time-out according to a preset inspection arrival time, and if not, sending a task matching success reminder to the handheld terminal of the optimal safety inspector; and after the optimal safety inspector completes inspection and maintenance, instructing the optimal safety inspector to photograph a maintained LNG smart terminal to obtain an inspection completion image and upload the inspection completion image, obtain an inspection and maintenance operation result through the maintained LNG smart terminal, and send the inspection completion information, and confirming completion of the task after receiving the inspection completion image and the inspection completion information.

6. The non-transitory computer-readable storage medium according to claim 1, wherein the one or more processors are further caused to perform operations including:

obtaining a terminal location distribution of LNG smart terminals that currently need inspections; and determining a preset inspection distance condition based on the terminal location distribution.

7. The non-transitory computer-readable storage medium according to claim 6, wherein the one or more processors are further caused to perform operations including:

determining an inspection geometric center of locations of the LNG smart terminals that currently need inspections based on the terminal location distribution, including: regarding n LNG smart terminals that currently need inspections as mass points, whose masses are $m_1$, $m_2$, $m_3$, . . . , and $m_n$, respectively, wherein a distribution of terminal locations is [$(x_1, y_1)$, $(x_2, y_2)$, $(x_3, y_3)$ . . . $(x_n, v_n)$], and calculating the inspection geometric center $(x_a, y_a)$ by equations:

$$x_a = \frac{\sum_{i=1}^{n} m_i x_i}{\sum_{i=1}^{n} m_i},$$

$$y_a = \frac{\sum_{i=1}^{n} m_i y_i}{\sum_{i=1}^{n} m_i},$$

wherein $x_i$ is a horizontal coordinate of a location of an i-th LNG smart terminal ($1 \leq i \leq n$); $y_i$ is a vertical coordinate of the location of the i-th LNG smart terminal; $m_i$ is a mass of the i-th LNG smart terminal when it is regarded as a mass point; wherein when the n LNG smart terminals that currently need inspections are regarded as mass points, the masses of the n LNG smart terminals that currently need inspections are positively correlated with failure probability distributions of the LNG smart terminals;

determining an inspection radius based on the inspection geometric center, wherein the inspection radius refers to a distance between a safety inspector and the inspection geometric center; and determining the preset inspection distance condition based on the inspection radius, including: determining the preset inspection distance condition to be that a distance between the safety inspector and the inspection geometric center is smaller than the inspection radius.

8. The non-transitory computer-readable storage medium according to claim 1, wherein the terminal features include a failure probability distribution.

9. The non-transitory computer-readable storage medium according to claim 1, wherein the time prediction layer is obtained by training the plurality of first training samples with the first labels, the plurality of first training samples with the first labels are input into an initial time prediction layer, a loss function is constructed through the first labels and results of the initial time prediction layer, and parameters of the initial time prediction layer are iteratively updated based on the loss function, and when the loss function of the initial time prediction layer satisfies a second preset iteration condition, training is completed, and the time prediction layer is obtained, wherein the second preset iteration condition is that the loss function converges, or a count of iterations reaches a threshold.

10. The non-transitory computer-readable storage medium according to claim 1, wherein the time integration layer calculates an average of candidate completion times of a plurality of candidate inspection routes, and outputs the average as the inspection completion time.

* * * * *